United States Patent
Cazaux et al.

(10) Patent No.: US 7,253,393 B2
(45) Date of Patent: Aug. 7, 2007

(54) CONTROL OF A PHOTOSENSITIVE CELL

(75) Inventors: Yvon Cazaux, Grenoble (FR); Didier Herault, Grenoble (FR)

(73) Assignee: STMicroelectronics S.A., Montrouge (FR)

(*) Notice: Subject to any disclaimer, the term of this patent is extended or adjusted under 35 U.S.C. 154(b) by 555 days.

(21) Appl. No.: 10/820,407

(22) Filed: Apr. 8, 2004

(65) Prior Publication Data

US 2004/0200954 A1    Oct. 14, 2004

(30) Foreign Application Priority Data

Apr. 11, 2003   (FR) ................................. 03 04564

(51) Int. Cl.
| | |
|---|---|
| H01L 31/00 | (2006.01) |
| H01L 27/00 | (2006.01) |
| G01J 1/44 | (2006.01) |
| H01J 40/14 | (2006.01) |
| H03F 3/08 | (2006.01) |

(52) U.S. Cl. .............................. 250/214.1; 250/214 R; 250/208.1; 327/514; 257/225; 348/294

(58) Field of Classification Search ............. 250/208.1, 250/214.1, 214 R; 257/225–234, 290–292; 327/514; 348/294, 302, 307–311
See application file for complete search history.

(56) References Cited

U.S. PATENT DOCUMENTS 6,046,444 A * 4/2000 Afghahi .................... 250/208.1
6,946,636 B2 * 9/2005 Eguchi et al. ............ 250/208.1
2002/0051229 A1   5/2002 Sakurai et al.
2004/0135070 A1 * 7/2004 Cazaux et al. ........... 250/214.1

FOREIGN PATENT DOCUMENTS

EP           0 999 698 A2    5/2000

OTHER PUBLICATIONS

French Search Report from French Patent Application 03/04564, filed Apr. 11, 2003.

* cited by examiner

*Primary Examiner*—Georgia Epps
*Assistant Examiner*—Patrick J. Lee
(74) *Attorney, Agent, or Firm*—Lisa K. Jorgenson; James H. Morris; Wolf, Greenfield & Sacks, P.C.

(57) ABSTRACT

A method for controlling a photosensitive cell including a photodiode connected to a read node via a MOS transfer transistor, the read node being connected to a source of a reference voltage via a MOS reset transistor, cyclically including a waiting phase at the end of which the photodiode is isolated from the reference voltage; an integration phase during which the voltage of the photodiode varies from a reset voltage to a useful voltage that depends on the lighting; and a phase of reading a voltage representative of the useful voltage, wherein the isolation of the photodiode of the read node at the end of the waiting phase includes the steps of setting the transfer transistor to the on state, the reset transistor being off; turning off the transfer transistor; and setting the reset transistor to the on state.

24 Claims, 3 Drawing Sheets

CONTROL OF A PHOTOSENSITIVE CELL

BACKGROUND OF THE INVENTION

1. Field of the Invention

The present invention relates to the control of a photosensitive cell of an image sensor for use in shooting devices such as, for example, video cameras or digital photographic devices. More specifically, the present invention relates to a semiconductor monolithic photosensitive cell.

2. Discussion of the Related Art

FIG. 1 schematically illustrates the circuit of a photosensitive cell of an array of photosensitive cells distributed in rows and columns of an image sensor. To each photosensitive cell of the array are associated a reset device and a read device. The reset device is formed of an N-channel MOS transistor $M_1$, interposed between a supply rail Vdd and a read node S. The gate of reset transistor $M_1$ is capable of receiving a reset control signal RST. Read node S is capable of storing charges. For this purpose, a diode formed by a separate component may be connected to node S. The capacitance of node S may also correspond to the capacitances of the sources of transistors $M_1$ and $M_4$, to the input capacitance of transistor $M_2$, and to all the stray capacitances present at node S.

The read device is formed of the series connection of first and second N-channel MOS transistors $M_2$, $M_3$. The drain of the first read transistor $M_2$ is connected to supply rail Vdd. The source of the second read transistor $M_3$ is connected to an output terminal P. The gate of first read transistor $M_2$ is connected to read node S. The gate of second read transistor $M_3$ is capable of receiving a read signal RD. The relative position of read transistors $M_2$ and $M_3$ may be inverted without substantially modifying the device operation.

The photosensitive cell comprises a photodiode D having its anode connected to a reference supply rail or circuit ground GND and its cathode connected to read node S via an N-channel MOS transfer transistor $M_4$. The gate of transfer transistor $M_4$ is capable of receiving a transfer control signal $T_X$. Generally, signals RD, RST, and $T_X$ are provided by control circuits, not shown in FIG. 1, and may be simultaneously provided to all the photosensitive cells of the same row of the cell array. Output terminals P of the photosensitive cells of the same column are connected to a processing circuit (not shown).

FIG. 2 shows an example of a timing diagram of signals RD, RST, $T_X$, of voltage $V_S$ between read node S and the circuit ground, and of voltage $V_D$ across photodiode D of the circuit of FIG. 1 between two read cycles of the photosensitive cell. Signals RD, RST, and $T_X$ are binary signals varying between high and low levels that can be different for each of the signals.

Duration $T_{RD}$ corresponds to the duration of a read cycle. At the beginning of a read cycle, a given amount of charges (electrons) is stored at the level of photodiode D. The read cycle starts when signal RD switches high, which corresponds to the selection of the array row containing the photosensitive cell to be read. Signal RST is then high. Reset transistor $M_1$ is thus on. Voltage $V_S$ is then substantially equal to voltage Vdd. Signal RST is then set to the low state. Reset transistor $M_1$ is then off. Voltage $V_S$ at read node S is then set to a reset level $V_{RST}$ that can be lower than voltage Vdd due to a coupling with reset transistor $M_1$. Reset level $V_{RST}$ is generally disturbed by noise essentially coming from the thermal noise of the channel of reset transistor $M_1$. This noise is sampled and maintained on the read node upon blocking of reset transistor $M_1$. Reset level $V_{RST}$ is then stored outside the photosensitive cell via read transistors $M_2$, $M_3$.

Control signal $T_X$ is then set to the high state. Transfer transistor $M_4$ is thus on, which enables transfer of the charges stored in photodiode D to read node S. Photodiode D is designed so that all the charges stored therein are transferred to read node S. Voltage $V_S$ then decreases to a useful signal level $V_U$. Signal $T_X$ is then set back to the low level. Photodiode D is thus isolated again and, due to the lighting, charges are stored again. Useful signal level $V_U$ at read node S is then read via read transistors $M_2$, $M_3$. Like reset level $V_{RST}$, useful signal level $V_U$ is disturbed, in particular, by the thermal noise of the channel of reset transistor $M_1$ which has been sampled and maintained on the read node. The subtraction of signals $V_U$ and $V_{RST}$ by the processing circuit enables suppressing the noise of reset transistor $M_1$ by a double correlated sampling. Signal RST is then set to the high level. Voltage $V_S$ at read node S is then maintained equal to voltage Vdd. The read cycle ends when signal RD is set to the low state to deselect the photosensitive cell.

Duration $T_{FR}$ between the beginning of two read cycles of the same row of photosensitive cells corresponds to the duration or period of an image sensor frame. Duration $T_{IRD}$ between the end of a read cycle of a cell row and the beginning of the next read cycle of the same cell row may be such that under too strong a lighting, a saturation of the photodiode may occur. It is thus preferable to limit duration $T_{INT}$ of the integration phase during which charges are formed and stored at the level of each photodiode D.

For this purpose, an example of a conventional control consists of maintaining reset control signal RST high for the entire duration $T_{IRD}$ between two read cycles of the same row. Transfer control signal $T_X$ is set to the high level little after the end of a read cycle. Photodiode D then permanently discharges towards the supply rail. Signal $T_X$ is set to the low state at the end of a duration $T_{RST}$ after the end of the read cycle, to start an integration phase.

For technologies of increasing density with photosensitive cells of small dimensions and control signals that become smaller and smaller, it becomes difficult to ensure proper transfer of charges from photodiode D to read node S during a read cycle or before the beginning of an integration phase.

To improve the charge transfer, the high level of signal $T_X$ applied on the gate of transfer transistor $M_4$ is increased to increase the intensity of the electric field enabling flowing of the charges. However, if this level becomes too high, a potential well is created in the channel of transfer transistor $M_4$ of a value greater than reset voltage $V_{RST}$. Charges can then be stored during the charge transfer to the channel region of transfer transistor $M_4$. Part of these charges can then be sent back to photodiode D at the falling edge of signal $T_X$ from the high level to the low level.

When the photosensitive cell is submitted to a low lighting, the charge return risk appears to be stronger with such an implementation when transfer signal $T_X$ is set to the low state before the beginning of an integration phase than during a read cycle. This may translate as a charge injection from read node S to the photodiode before the integration phase and may result in an offset of the signal subsequently measured in the absence of light, with an increase of non-uniformities at a low signal level.

SUMMARY OF THE INVENTION

The present invention provides a method and a device for controlling a photosensitive cell enabling improvement of the complete transfer of the photodiode charges to the read node before the beginning of an integration phase of the photodiode.

The present invention provides a method for controlling a photosensitive cell comprising a photodiode connected to a read node via a MOS transfer transistor, the read node being connected to a source of a reference voltage via a MOS reset transistor, cyclically comprising a waiting phase of non-zero duration at the end of which the photodiode is isolated from the reference voltage; an integration phase during which the voltage of the photodiode varies from a reset voltage to a useful voltage that depends on the lighting; and a phase of reading a voltage representative of the useful voltage, wherein the isolation of the photodiode from the read node at the end of the waiting phase comprises the steps of setting the transfer transistor to the on state, the reset transistor being off; turning off the transfer transistor; and setting the reset transistor to the on state.

According to an embodiment of the present invention, the step of setting the transfer transistor to the on state is preceded by a step of turning off the reset transistor, the transfer transistor being off.

According to an embodiment of the present invention, a turning-off of the transfer transistor is performed during the read phase preceding the waiting phase, the transfer transistor being maintained off at the beginning of the waiting phase.

According to an embodiment of the present invention, a turning-off of the transfer transistor is performed during the waiting phase before turning-off of the reset transistor.

According to an embodiment of the present invention, the reset transistor is turned on as soon as the read phase preceding the waiting phase is over, and is maintained on at the beginning of the waiting phase.

According to an embodiment of the present invention, the step of turning off the reset transistor is carried out during the read phase preceding the waiting phase, the reset transistor being maintained off at the beginning of the waiting phase.

According to an embodiment of the present invention, the transfer transistor is temporarily turned on several times to discharge the photodiode at the end of the waiting phase, the reset transistor being maintained off.

The present invention also provides a device for controlling a photosensitive cell comprising a photodiode having its voltage varying according to the lighting, the photodiode being connected to a read node via a MOS transfer transistor, the read node being connected to a source of a reference voltage via a MOS reset transistor, a means for reading a voltage representative of the photodiode voltage, a means for isolating the photodiode from the reference voltage, and a timing means for delaying the photodiode isolation by the isolation means after reading of the representative voltage by the read means, wherein the isolation means comprises a means for temporarily turning on the transfer transistor while maintaining the reset transistor off.

According to an embodiment of the present invention, the MOS reset transistor and/or the MOS transfer transistor are shared between several photosensitive cells.

According to an embodiment of the present invention, the read means is shared between several photosensitive cells.

The foregoing object, features, and advantages of the present invention will be discussed in detail in the following non-limiting description of specific embodiments in connection with the accompanying drawings.

DETAILED DESCRIPTION

The present inventors have studied the variation of the characteristic voltages at the level of a photosensitive cell to reveal the phenomena that favor the charge return in a read cycle or before the beginning of an integration phase of a photosensitive cell.

Figure 1:
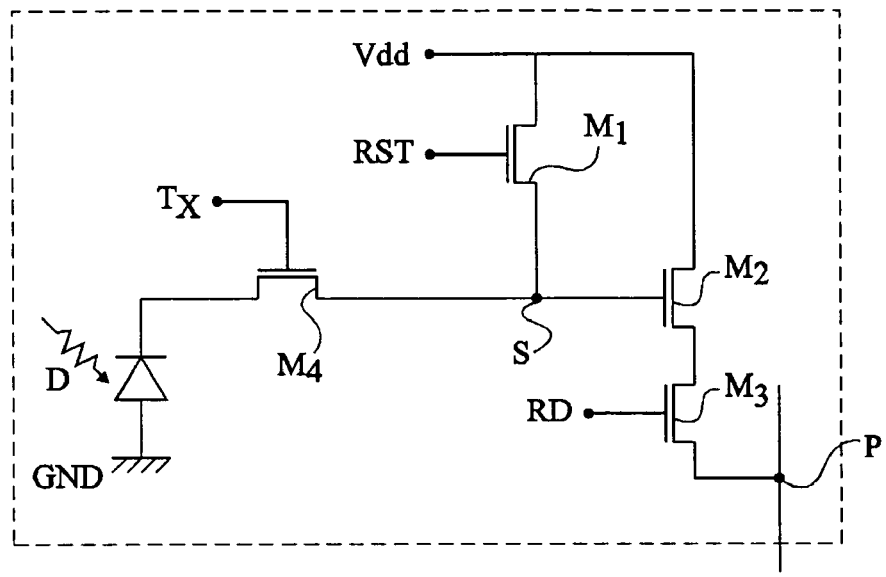
FIG. 1, previously described, shows an electric diagram of a photosensitive cell.
Figure 3:
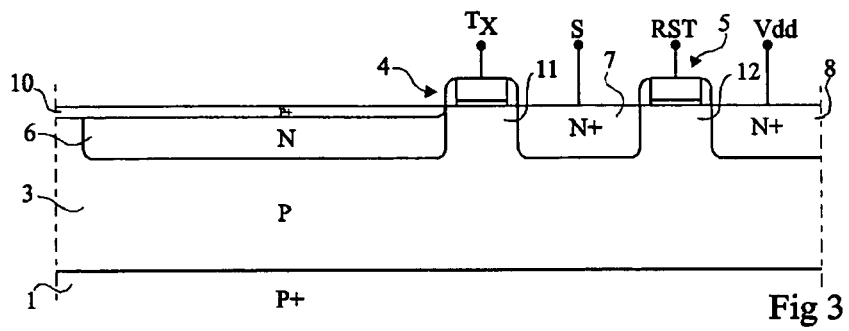
FIG. 3 shows a partial simplified cross-section view of a portion of the circuit of FIG. 1 made in monolithic form.

FIG. 3 illustrates, in a partial simplified cross-section view, a conventional implementation in monolithic form of the assembly of photodiode D, transfer transistor $M_4$, and reset transistor $M_1$ of FIG. 1. These elements are formed in the same active area of a heavily-doped semiconductor substrate 1 of a first conductivity type, for example, type P ($P^+$). The substrate is connected to reference supply rail GND. The active area corresponds to a layer 3 of same conductivity type as underlying substrate 1, but more lightly doped, for example, an epitaxial layer. Above the surface of layer 3 are formed two insulated gate structures 4, 5, possibly provided with lateral spacers, respectively associated with transistors $M_4$ and $M_1$. To the left of gate 4, between gates 4, 5 and to the right of gate 5, are respectively present at the surface of layer 3 regions 6, 7, 8 of the opposite conductivity type, for example, N.

Region 7, intermediary between gates 4, 5, is heavily doped ($N^+$) and respectively forms the drain and the source of transistors $M_4$ and $M_1$. It is called hereafter the read region 7. Region 6 to the left of gate structure 4, which will be called the photodiode region hereafter, is formed on a much greater surface area than read region 7. It forms the source of transistor $M_4$ and forms with underlying layer 3 the junction of photodiode D. Region 8, to the right of gate 5, which will be called the supply region hereafter, forms the drain of transistor $M_1$. Gate 4, read region 7, gate 5, and supply region 8 are integral with connections (not shown) that enable putting in contact these regions respectively with transfer control signal $T_X$, the gate of transistor $M_2$ (node S), reset control signal RST, and supply rail Vdd. Photodiode D is of the so-called completely depleted type and comprises, at the surface of photodiode region 6, a P-type region 10, shallow and more heavily doped ($P^+$) than layer 3 and connected to the reference voltage or to ground via layer 3 and substrate 1. The channel regions of transistors $M_4$ and $M_1$ are respectively designated with reference numerals 11 and 12.

Figure 2:
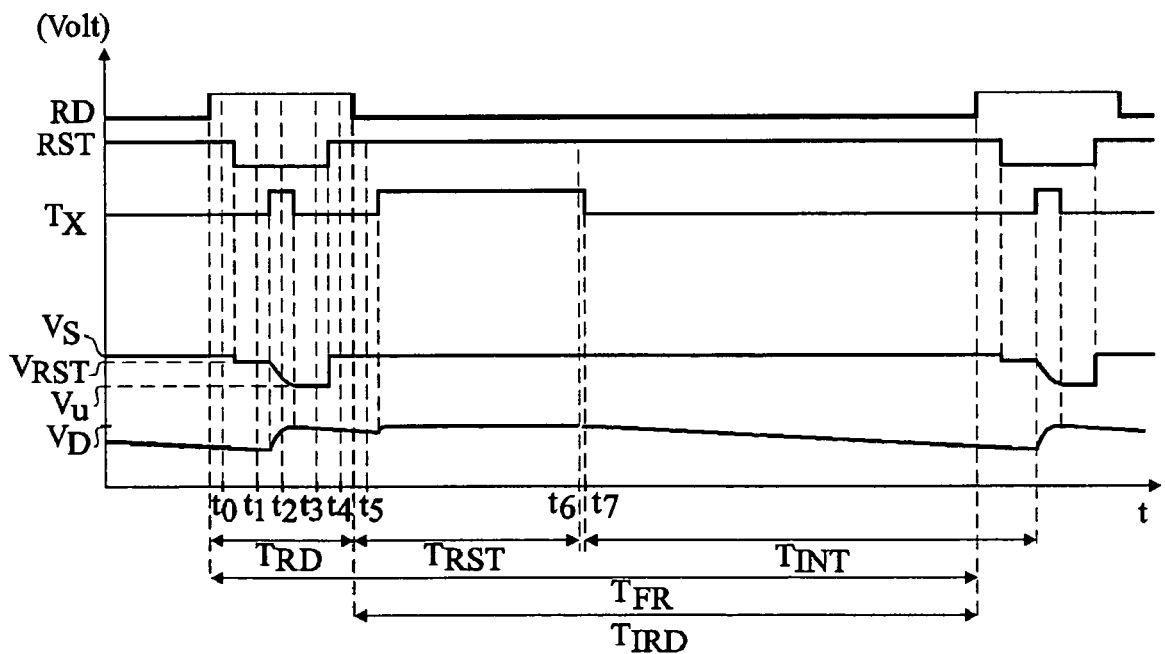
FIG. 2, previously described, illustrates a conventional timing diagram of characteristic voltages of the circuit of FIG. 1.

FIGS. 4A to 4H schematically illustrate the highest voltage levels in the different regions of FIG. 3 successively at successive times $t_0$ and $t_6$ of the timing diagram of FIG. 2.

Figure 4A:
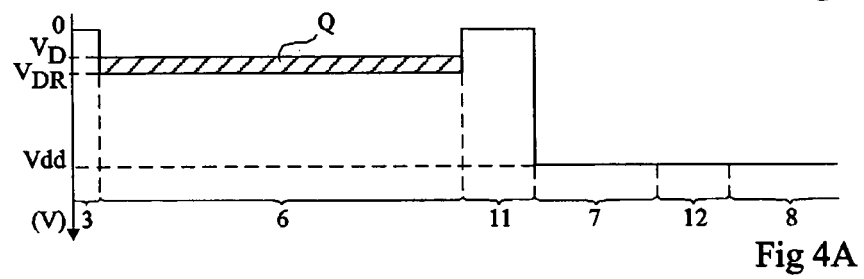
FIGS. 4A to 4H schematically show voltage levels in the structure of FIG. 3 at given times of the timing diagram of FIG. 2.

At time $t_0$, at the beginning of a read cycle of the photosensitive cell, photodiode D has stored an amount of charges shown as a hatched area Q in FIG. 4A, delimited by a voltage $V_D$ corresponding to the voltage in photodiode region 6 and voltage $V_{DR}$ of photodiode D when it is completely discharged. Transfer control signal $T_X$ is low. The voltage of channel region 11 of transistor $M_4$ is thus close to zero volt. Read region 7, of channel region 12 of transistor $M_4$, and of supply region 8, are at the voltage of power supply Vdd.

Figure 4B:
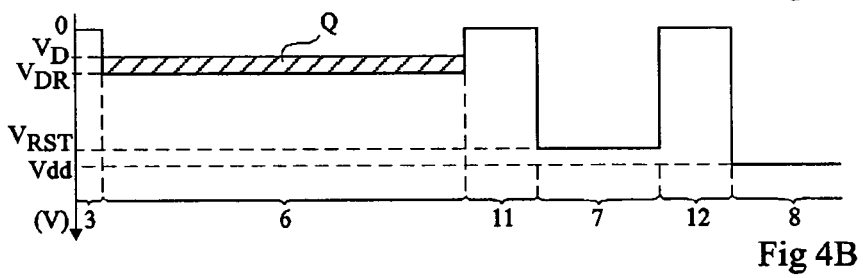

At time $t_1$, as shown in FIG. 4B, reset control signal RST is set to the low state. The voltage of channel region 12 of transistor $M_1$ is thus close to zero volt. Due to coupling phenomena between read region 7 and transistor $M_1$, the voltage of read region 7 becomes a voltage $V_{RST}$ slightly smaller than the voltage of power supply Vdd.

Figure 4C:
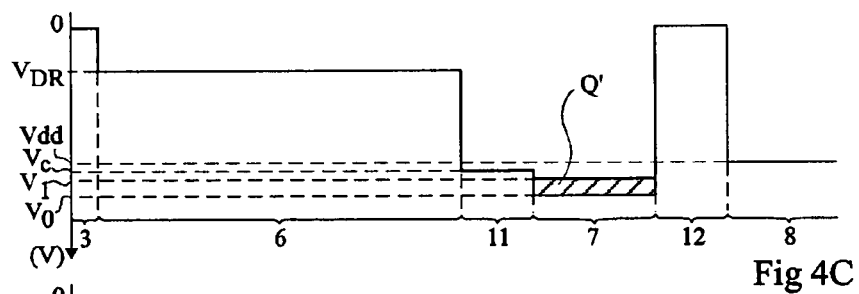

At time $t_2$, as shown in FIG. 4C, transfer control signal $T_X$ is set to a high state, sufficiently high for voltage $V_C$ of channel region 11 to be greater than Vdd. The voltage of read region 7 increases to reach a voltage $V_0$ due to the coupling between transistor $M_4$ and read region 7. This enables increasing the electric field favoring the charge transfer from photodiode D to read node S. The charges stored at the level of photodiode D flow to read region 7 and diminish the voltage of this region to value $V_1$. In the case where charge Q is relatively low, voltage $V_1$ may be greater than Vdd and greater than $V_C$. Hatched region Q' delimited by voltages $V_0$ and $V_1$ shows the charges stored at the level of read region 7.

Figure 4D:
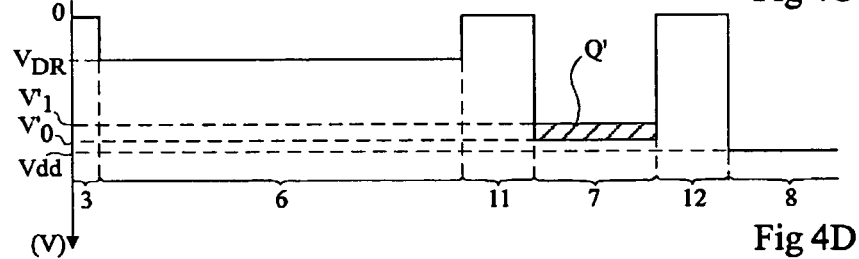

At time $t_3$, as shown in FIG. 4D, transfer signal $T_X$ is set to the low state. The voltage of channel region 11 of transistor $M_4$ then switches to zero. Since no charge is stored in channel region 11 for small charges Q, there then is no charge return to photodiode D. The coupling of the edge of transfer signal $T_X$ brings voltage $V_0'$ substantially to voltage $V_{RST}$ of FIG. 4B.

Figure 4E:
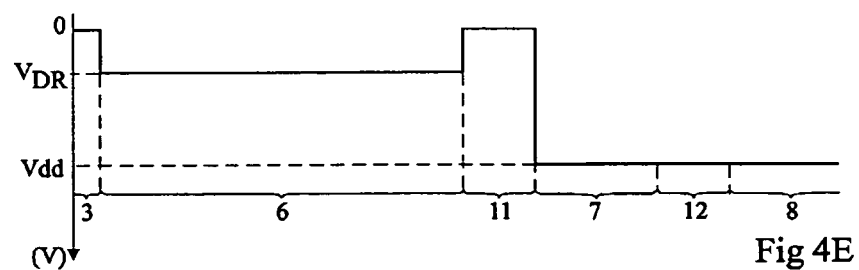

At time $t_4$, as shown in FIG. 4E, reset control signal RST is set to the low state. The voltage of channel region 12 of transistor $M_1$ thus increases to enable flowing of charges Q' stored at the level of read region 7 to supply region 8. The voltages of regions 7, 12, and 8 thus stabilize at the level of supply voltage Vdd.

Figure 4F:
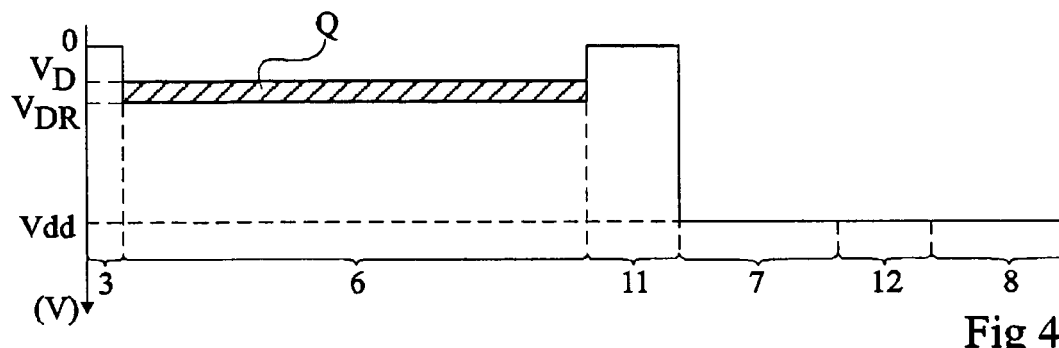

At time $t_5$, as shown in FIG. 4F, after the end of the read cycle and before the beginning of the next integration phase, control signals $T_X$ and RST have the same value as at time $t_4$. However, a certain amount of charges have been generated and stored at the level of diode D as shown by crossed-out region Q.

Figure 4G:
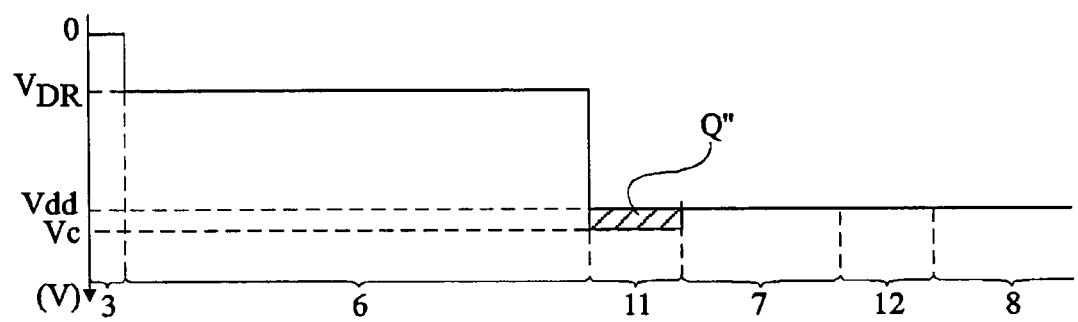

At time $t_6$, as shown in FIG. 4G, transfer control signal $T_X$ is set to the high state. The charges stored at the level of photodiode D flow to supply region 8 and the voltages of regions 11, 7, 12, and 8 stabilize at value Vdd. Charges are then stored at the level of channel region 11 and are shown by hatched area Q" delimited by voltage Vdd and voltage $V_C$ set by the value of the high state of transfer control signal $T_X$.

The present inventors have underlined, in FIG. 4G, that when signal $T_X$ is set to the high state, no coupling occurs between transistor $M_4$ and read region 7. Indeed, transistor $M_1$ being off, read region 7 is not isolated from supply region 8 and is thus at low impedance.

Figure 4H:
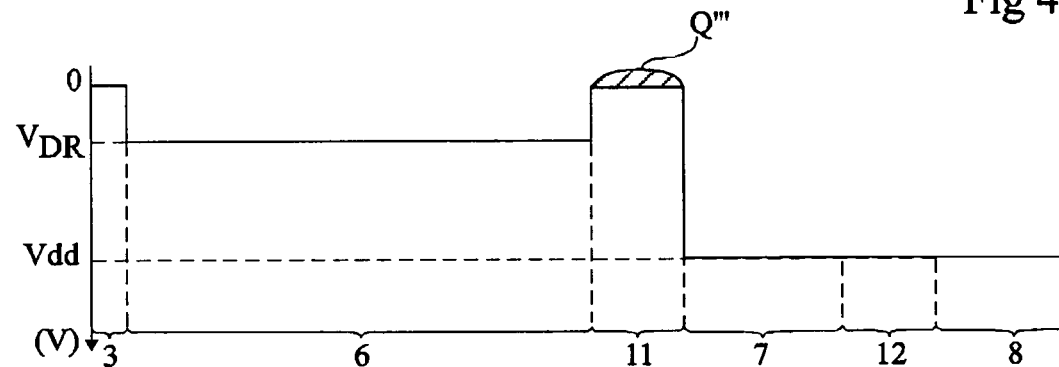

At time $t_7$, as shown in FIG. 4H, transfer control signal $T_X$ is set to the low state. Part of charges Q" stored at the level of channel region 11 in FIG. 4G then risk being sent back to the photodiode, as schematically illustrated by charge amount Q'".

The present invention thus comprises providing a particular timing diagram of the control signals of a photosensitive cell before the beginning of a new integration phase to reduce the risk of charge return.

Figure 5:
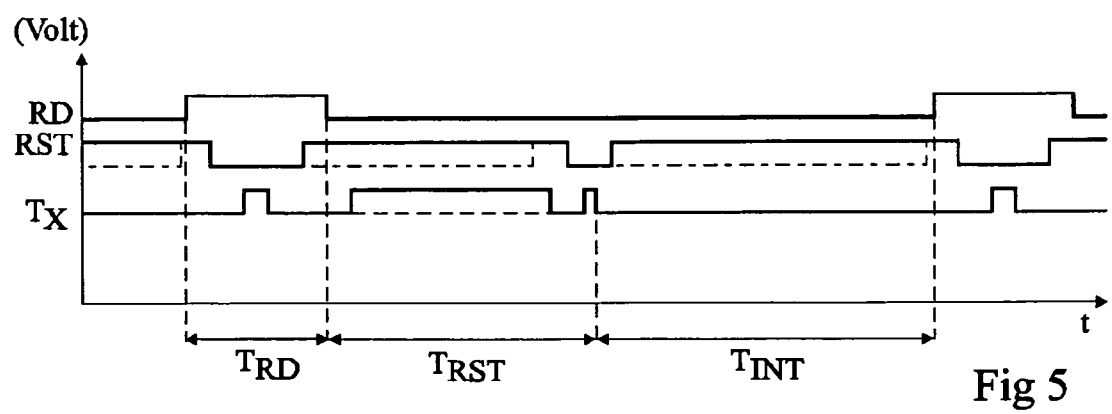
FIG. 5 shows an example of a timing diagram of characteristic voltages according to the present invention of the circuit of FIG. 1.

FIG. 5 shows two examples of implementation of a timing diagram according to the present invention. In the first example of implementation shown in full lines, reset signal RST is maintained on from the end of the read cycle and transfer control signal $T_X$ is set to the high state little after the end of the read cycle. The control method provides, before the beginning of an integration phase $T_{INT}$, setting to the low state successively signal $T_X$ and signal RST. Signal $T_X$ is then set back to the high state for a short time, then back to the low state. This then provides the favorable coupling illustrated in FIG. 4C between transistor $M_4$ and read region 7 due to the fact that said region is at high impedance upon setting to the high state of signal $T_X$ since it is then isolated from supply region 8. The first falling edge of signal $T_X$ is performed while signal RST is high, so that read region 7 is at low impedance and that there is no unfavorable coupling between transfer transistor $M_4$ and read region 7.

According to the present example of implementation, shown in dotted lines, signals RST and $T_X$ are maintained low from the end of the preceding read cycle. The present invention provides setting to the high state signal RST for a short time, to completely discharge read node S and setting it back to the low state, than setting signal $T_X$ to the high state for a short time, and setting it back to the low state while signal RST still is at the low state.

The present invention thus comprises, before starting a new integration period, performing a rising edge and a falling edge of the transfer control signal where read region 7 is at high impedance to benefit from a favorable coupling.

It should be noted that several successive pulses of transfer control signal T may be provided before the beginning of an integration period.

The control method according to the present invention enables obtaining, upon discharge of the photodiode before the beginning of an integration phase, a favorable coupling phenomenon which enables reducing the risk of charge return to the photodiode when the amount of charges stored in the photodiode is small. The occurrence of defects on an image formed based on the reading of the photosensitive cells is thus reduced, particularly for low lightings. This is particularly advantageous given the increased sensitivity of users to defects of images obtained under low lightings.

Of course, the present invention is likely to have various alterations, modifications, and improvements which will readily occur to those skilled in the art. In particular, the present invention has been described in the context of a photosensitive cell with four MOS transistors (4T cell). It should be clear that the present invention finds an application for other types of photosensitive cells. It may be, for example, a photosensitive cell having one or several MOS transistors in common with one or several other photosensitive cells.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling a photosensitive cell, the photosensitive cell comprising a photodiode connected to a read node via a MOS transfer transistor, the read node being connected to a reference voltage via a MOS reset transistor, the photosensitive cell further comprising at least three cyclical phases, including:

a waiting phase of non-zero duration, at the end of which the photodiode is isolated from the reference voltage;

an integration phase during which the voltage of the photodiode varies from a reset voltage to a useful voltage that depends on the lighting; and a read phase of reading a voltage representative of the useful voltage, wherein the isolation of the photodiode from the reference voltage at the end of the waiting phase comprises an isolation of the photodiode from the read node, the method comprising:

setting the MOS transfer transistor to an on state, the MOS reset transistor being in an off state;

turning the MOS transfer transistor to an off state; and setting the MOS reset transistor to an on state.

2. The method of claim 1, wherein the step of setting the transfer transistor to the on state is preceded by a step of turning the reset transistor to an off state while the transfer transistor is in an off state.

3. The method of claim 1, wherein turning the transfer transistor to the off state is performed during the read phase preceding the waiting phase, and the transfer transistor is maintained in an off state at the beginning of the waiting phase.

4. The method of claim 2, wherein the turning of the transfer transistor to the off state is performed during the waiting phase before turning the reset transistor to the off state.

5. The method of claim 1, wherein the reset transistor is turned to the on state as soon as the read phase preceding the waiting phase is over, and is maintained in an on state at the beginning of the waiting phase.

6. The method of claim 2, wherein turning the reset transistor to the off state is carried out during the read phase preceding the waiting phase, and the reset transistor is maintained in an off state at the beginning of the waiting phase.

7. The method of claim 1, wherein the transfer transistor is temporarily turned to the on state several times to discharge the photodiode at the end of the waiting phase while the reset transistor is maintained in an off state.

8. A device for controlling a photosensitive cell comprising:

a photodiode having a varying voltage according to the lighting, the photodiode being connected to a read node via a MOS transfer transistor, and the read node being connected to a reference voltage via a MOS reset transistor;

means for reading a voltage representative of the photodiode voltage;

means for isolating the photodiode from the reference voltage; and timing means for delaying isolating the photodiode isolation after reading of the voltage representative of the photodiode voltage by the read means; wherein the means for isolating the photodiode from the reference voltage comprises means for temporarily turning the transfer transistor to an on state while maintaining the reset transistor in an off state.

9. The device of claim 8, wherein the MOS reset transistor and/or the MOS transfer transistor are shared between several photosensitive cells.

10. The device of claim 8, wherein the means for reading a voltage representative of the photodiode voltage is shared between several photosensitive cells.

11. The method of claim 1, wherein the steps are performed in the order presented.

12. A photosensitive cell comprising:

a photodiode configured to have a varying voltage according to lighting;

a read node connected to the photodiode via a MOS transfer transistor;

a reference voltage source connected to the read node via a MOS reset transistor;

first and second MOS read transistors connected serially, the MOS read transistors being configured to read a voltage representative of the photodiode voltage; and a control circuit configured to send signals to the MOS transfer transistor, the MOS reset transistor, and the second MOS read transistor; wherein the control circuit is configured to, during a waiting phase after a read phase, send signals to the transistors to, in order: turn the MOS transfer transistor to an on state with the MOS reset transistor being in an off state, turn the MOS transfer transistor to an off state, and turn the MOS reset transistor to an on state, all while the control circuit maintains the second MOS read transistor in an off state.

13. The photosensitive cell of claim 12, wherein the MOS read transistors are configured to read the voltage of the photodiode.

14. The photosensitive cell of claim 12, wherein the control circuit comprises at least two control circuits.

15. The photosensitive cell of claim 12, wherein the control circuit is configured to turn the reset transistor to an off state before turning the MOS transfer transistor to an on state.

16. The photosensitive cell of claim 12, wherein the control circuit is configured to turn the transfer transistor to the off state during the read phase, and the control circuit is configured to maintain the transfer transistor in an off state at the beginning of the waiting phase.

17. The photosensitive cell of claim 15, wherein the control circuit is configured to turn the transfer transistor to the off state during the waiting phase before turning the reset transistor to the off state.

18. The photosensitive cell of claim 12, wherein the control circuit is configured to turn the reset transistor to the on state as soon as the read phase preceding the waiting phase is over, and maintain the reset transistor in an on state at the beginning of the waiting phase.

19. The photosensitive cell of claim 15, wherein the control circuit is configured to turn the reset transistor to the off state during the read phase preceding the waiting phase, and to maintain the reset transistor in the off state at the beginning of the waiting phase.

20. The photosensitive cell of claim 12, wherein the control circuit is configured to temporarily turn the transfer transistor to the on state several times to discharge the photodiode at the end of the waiting phase while the reset transistor is maintained in the off state.

21. The photosensitive cell of claim 12, wherein the control circuit is configured to cyclically repeat turning the MOS transfer transistor to the on state with the MOS reset transistor being in the off state, turning the MOS transfer transistor to the off state, and turning the MOS reset transistor to the on state, all while the control circuit maintains the second MOS read transistor in the off state.

22. A method for controlling a photosensitive cell, the method comprising:
    providing at least one timing control to the photosensitive cell; and
    thereafter beginning an integration phase;
    wherein providing at least one timing control signal to the photosensitive cell comprises, in order, maintaining a reset control signal and a transfer control signal in a low state from an end of a preceding read cycle, setting the reset control signal to a high state to discharge a read node, returning the reset control signal to the low state, setting the transfer control signal to a high state, and returning the transfer control signal to the low state while the reset control signal remains at the low state.

23. The method of claim 22, wherein providing at least one timing control signal to the photosensitive cell comprises setting a transfer control signal to a low state, setting a reset control signal to a low state, and thereafter setting the transfer control signal to a high state for a first period of time.

24. The method of claim 22, wherein providing at least one timing control signal to the photosensitive cell comprises performing a rising edge and a falling edge of a transfer control signal when a read region is at a high impedance.

* * * * *